United States Patent
Kasselmann

[11] 3,856,363
[45] Dec. 24, 1974

[54] ADJUSTABLE LINKAGE FOR TRANSMITTING THE OUTPUT FROM A SENSOR TO A CONTROL VALVE

[75] Inventor: John T. Kasselmann, South Bend, Ind.

[73] Assignee: The Bendix Corporation, South Bend, Ind.

[22] Filed: Sept. 24, 1973

[21] Appl. No.: 400,479

[52] U.S. Cl.................... 303/7, 137/38, 180/104, 188/3 R, 188/195, 303/22 R
[51] Int. Cl.............................................. B60t 13/10
[58] Field of Search.......... 303/7, 15, 22, 20; 188/3, 188/112, 195, 177; 180/103, 104, 82 R; 137/38, 46

[56] References Cited
UNITED STATES PATENTS

| | | | |
|---|---|---|---|
| 2,336,342 | 12/1943 | Brewer.................................. | 303/7 |
| 3,135,358 | 6/1964 | Greentree............................. | 188/3 |
| 3,150,899 | 9/1964 | Berg et al............................ | 303/22 R |
| 3,288,240 | 11/1966 | Franzel............................... | 188/112 |
| 3,415,579 | 12/1968 | Henry-Biabaud...................... | 303/7 |
| 3,566,987 | 3/1971 | Franzel............................... | 188/177 |
| 3,715,003 | 2/1973 | Jubenville........................... | 303/7 |
| 3,758,165 | 9/1973 | Savelli............................... | 188/3 R |

Primary Examiner—Trygve M. Blix
Assistant Examiner—D. C. Butler
Attorney, Agent, or Firm—Leo H. McCormick, Jr.; William N. Antonis

[57] ABSTRACT

In a tow vehicle-trailer braking system, a linkage arrangement for transmitting the output signal from a sensor to a control valve in response to an input force to operate a brake applying servomotor in the trailer. The output signal can be modified by an operator through a hand control to account for changes in weight in the trailer. In addition, when an anti-sway apparatus senses a centrifugal force adverse to the direction of travel, an actuation signal will be developed which will alleviate any harmonic movement in the trailer by momentarily applying the wheel brakes in the trailer.

6 Claims, 3 Drawing Figures

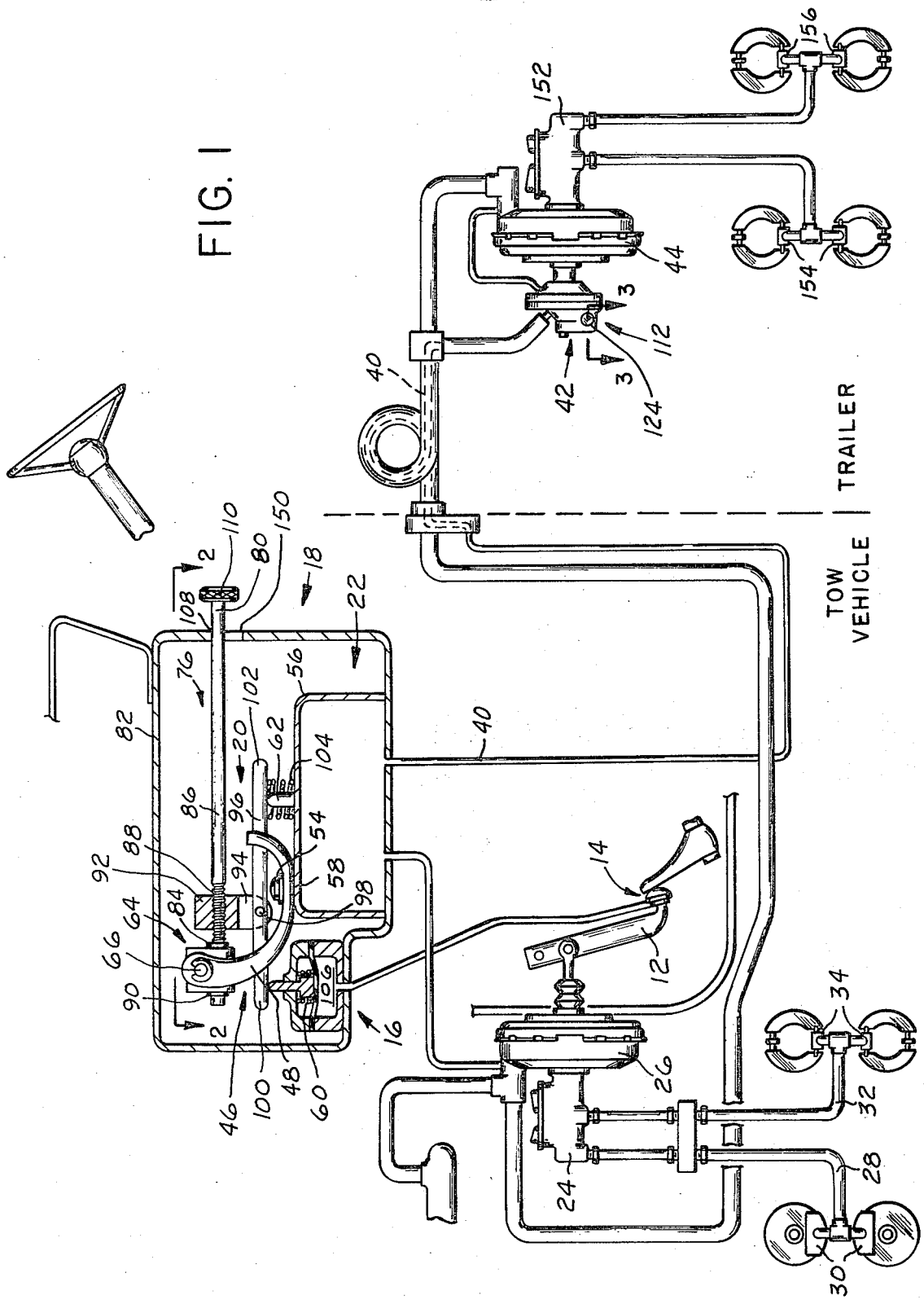

ADJUSTABLE LINKAGE FOR TRANSMITTING THE OUTPUT FROM A SENSOR TO A CONTROL VALVE

BACKGROUND OF THE INVENTION

With an ever increasing number of people purchasing house trailers, recreational trailers, and cargo trailers which are moved by a tow vehicle over roads which can vary from interstate highways to rails in the wilderness, it is necessary to provide adequate braking for a tow vehicle-trailer combination. Since the same tow vehicle can be used with each of these trailers, it is paramount that synchronized braking between the trailer and tow vehicle can be achieved.

In U.S. application Ser. No. 400,310, incorporated herein by reference, a braking system is disclosed wherein the input force applied to the brake pedal in the tow vehicle is received by a sensor to provide an actuation signal for the operation of a control valve. The control valve in response to the actuation signal will generate an operational signal for operating a motor which supplies a servomotor in the trailer with a corresponding input force. To accommodate for changes in the weight of the various trailers which could be used with the tow vehicle, the relationship between the sensor and the control valve can be changed accordingly. However, in some installations due to the position and length of the line through which the actuation signal is communicated, it is possible to develop a false actuation signal. The creation of the false actuation signal is enhanced when the sensor and the control valve are far apart as when the actuation signal is directly relayed to operate the control valve without any mechanical advantage.

SUMMARY OF THE INVENTION

I have devised a tow vehicle-trailer braking system wherein the output from a stationary sensor means is transmitted through an adjustable linkage means to operate a control valve and provide optimum braking between any tow vehicle-trailer combination on any road surface. The linkage means has a yoke means attached to the control valve. A hand control is pivotally fixed to the yoke means. The hand control has a lead screw which extends adjacent the pivotal connection. A bracket located on the lead screw forms the fulcrum for a lever means which extends between the sensor and the control valve. The lever means is held in axial alignment by arms which extend from the base of the yoke means. The base has an opening through which a bolt is secured to the control valve. The hand control has a locking position in which the yoke means is rotated with respect to the bolt. By rotating the yoke means, any binding between the fulcrum and the lever means will be prevented and the actuation signal will be transmitted to the control valve unimpeded.

It is, therefore, the object of this invention to provide a tow vehicle-trailer braking system with an adjustable linkage means for transmitting the output from a force sensor to a valve means.

It is another object of this invention to provide a tow vehicle-trailer braking system with a hand control means for overriding an actuation signal transmitted from a sensing means to operate the trailer brakes.

It is still a further object of this invention to provide a tow vehicle-trailer braking system with an anti-sway control for actuating the trailer brakes independently of the actuation signal generated by a sensor means.

These and other objects of this invention will become apparent from reading this specification and viewing the drawings.

BRIEF DESCRIPTION OF THE DRAWINGS

FIG. 1 is a schematic illustration of a tow vehicle-trailer braking system with a sectional view of a hand control means having linkage means for transferring the output from a force sensor to a valve means wherein an operational signal for energizing the wheel brakes is created.

DETAILED DESCRIPTION OF THE PREFERRED EMBODIMENT

Figure 3:
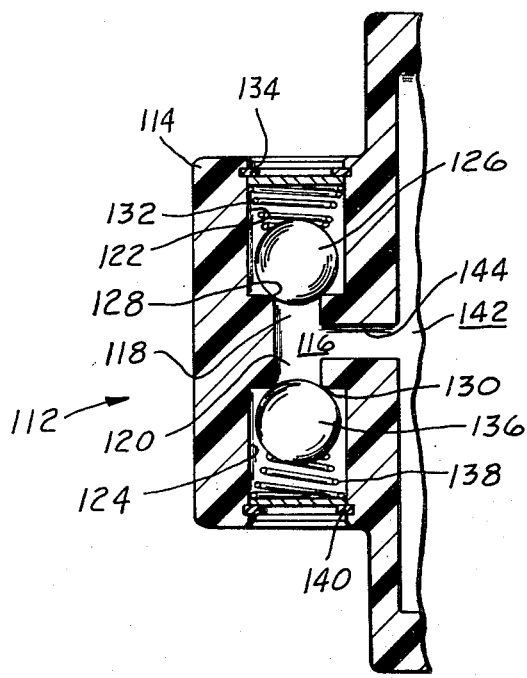
FIG. 3 is a sectional view taken along line 3—3 of FIG. 1 showing an anti-sway actuator for the tow vehicle-trailer braking system.

In the tow vehicle-trailer braking system shown in FIG. 1, an initial input force applied to the brake pedal 12 from the operator is sensed by the force cell means 14 and relayed to the force cell receiver means 16 in the hand control means 18 as an actuation signal. The actuation signal will cause the force cell receiver means 16 to generate an operational force which is transmitted through linkage means 20 to operate an input control valve means 22. The input control valve 22, as disclosed in U.S. Ser. No. 400,310 incorporated previously, upon receiving the operational force will supply the motor means 42 with an operational signal through conduit 40 to activate the servomotor 44.

An additional input force applied to the brake pedal 12 by the operator is required to overcome a return spring (not shown) in the servomotor 26 in order to develop a pressure differential across the power producing wall means, in a manner as taught in U.S. Pat. No. 3,106,873, incorporated herein by reference. This pressure differential will energize the master cylinder 24 to deliver pressurized hydraulic fluid through conduit 28 to the front brakes 30 and through conduit 33 to the rear brakes 34 of the tow vehicle. The force cell means 14 will simultaneously sense this additional input force supplied to the brake pedal and correspondingly transmit the same to the force cell receiver means 16. The force cell receiver means 16 will convert the actuation signal into a linear movement. This linear movement is transferred through the linkage means 20 to operate the control valve means 22. The control valve means 22 will immediately respond to the increase in the input force to provide a corresponding increase in the operational signal to the motor means 42. This increased operational signal will operate the motor means 42 to activate the atmospheric-vacuum control valve in servomotor 44.

Figure 2:
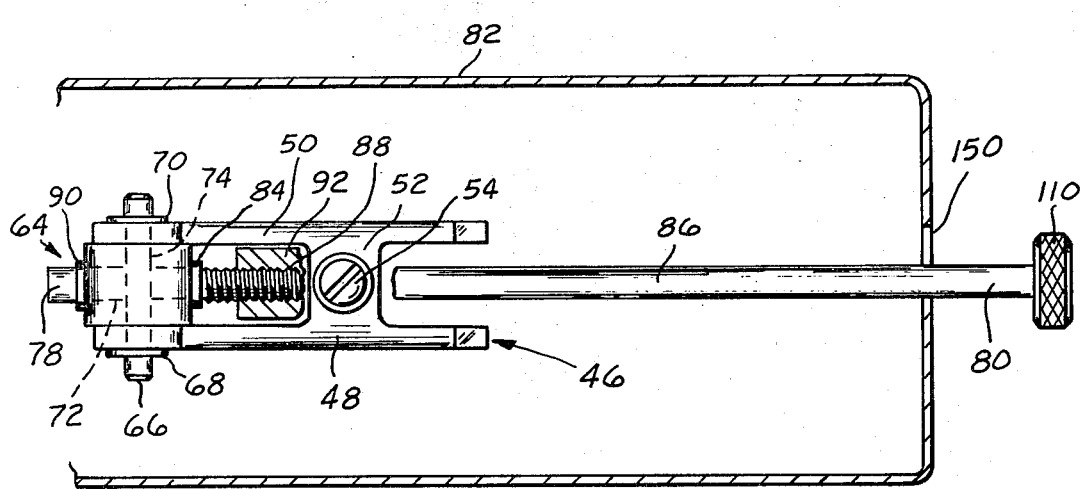
FIG. 2 is a sectional view taken along line 2—2 of FIG. 1.

In more particular detail, the linkage means 20 consists of a yoke means 46 which has a pair of curved arms 48 and 50 joined together by a spacer or plate 52, as best seen in FIG. 2. The spacer or plate 52 has a hole therein into which bolt or other fastener means 54 is inserted to secure the yoke to the housing 56 of the control valve means 22. The curved arms 48 and 50 each have a flat surface 58 which corporates with the housing 56 to maintain the yoke means in an upright position and substantially parallel position with respect to piston 60 in the force cell receiver means 16 and piston 62 in the control valve means 22. A bracket means 64 is located between the arms 48 and 50 by a pin 66 which extends therethrough. A first snap ring 68 is located on the pin 66 adjacent the arm 48 and a second snap ring 70 is located on the pin 66 adjacent the arm 50 to positively maintain the bracket means 64 on the yoke means 20. The bracket means 64 has an axial bore 72 therein perpendicular to the transverse bore 74 in which pin 66 is located.

An adjustable means 76 has a rod 86 with a first end 78 which is located in the axial bore 72 and a second end 80 which extends through the shroud 82 which encloses the hand control means 81. A washer 84 is located on the rod 86 adjacent threads 88 to limit the distance that the rod may extend into the bracket means 64. A snap ring 90 is located on end 78 to hold the washer 84 snug against the bracket means 64.

A fulcrum means 92 is attached to the rod 86 through the threads 88. The fulcrum means 92 has a clevis 94 to which a lever arm 96 is attached by a pin 98. The lever arm 96 has one end 100 connected to piston 60 and the other end 102 connected to piston 62. The curved arms 48 and 50 act as a guide for maintaining the lever 96 in axial alignment with piston 60 and piston 62. A spring 104 located between housing 56 and the end 102 of the lever 96 will oppose the movement of piston 60 by the hydraulic pressure signal transmitted to the closed chamber 106 from the force cell means 14.

The shroud 82 has a slotted opening 108 through which the end 80 of the rod 86 extends. A knob 110 is attached to end 80 to permit the operator to supply an actuation signal to the control valve means 22 for generating the motor means 42 independently of the movement of piston 60 by the hydraulic actuation signal transmitted to the closed chamber 106.

Additionally, an anti-sway means 112, as best shown in FIG. 3, can be automatically activated to permit the development of an operational signal for the motor 42. The anti-sway means 112 consists of a housing 114 with a chamber 116 therein. The chamber has a first inlet port 118 and a second inlet port 120 connected to the atmosphere through a first passage 122 and a second passage 124, respectively. The first and second passages are substantially at right angles to the direction of travel of the trailer while the first and second inlet ports are on opposite sides of chamber 116 in a plane parallel to the axles of the trailer. A first mass 126 is located in passage 122 and urged against a seat 128 by a first resilient means 132 to prevent air from entering chamber 116 through passage 122. The resilient means 132 is held in the passage 122 by a snap ring fastener 134 which engages the housing 114. A second mass 136 located in passage 124 is urged against seat 130 by a second resilient means 138 to prevent air from entering chamber 116 through passage 122. The resilient means 138 is held in passage 124 by a snap ring fastener 140 which engages the housing 114. The chamber 116 is connected to the control chamber 142 of the motor means 42 through passage 144. The same actuation signal that is transmitted from the control valve means 22 will be communicated to the chamber 116 and upon termination of this signal, vacuum will also evacuate air from this chamber to permit the motor means to return to a rest position.

MODE OF OPERATION OF THE PREFERRED EMBODIMENT

Upon an operator supplying an input force to the brake pedal 12 through pad 14, a hydraulic fluid pressure signal will be communicated to the closed chamber 106 causing the piston 60 to move and pivot the lever arm 96 about pin 98 to produce corresponding linear movement of piston 62 of the control valve means 22. The linear movement of piston 62 will allow a spring in the control valve means 22 to sequentially place a poppet means on a seat and interrupt vacuum communication from the intake manifold through conduit 40 to the motor means 42 and allow air to proportionally enter the conduit 40 and provide motor 42 with an operational signal. A diaphragm within the control valve means 22 which is connected to the piston 62 has one side exposed to the air in conduit 40 and the other side exposed to vacuum from the intake manifold for the development of a pressure differential thereacross. This pressure differential opposes the movement of the piston 62 to limit the amount of air which is permitted to enter conduit in the establishment of the operational signal which activates the motor means 42 for operating the wheel brakes in the trailer. The distance that end 102 of the lever arm 96 will move piston 62 is be dependent upon the relationship between the distance between pin 98 and the pistons 60 and 62. This relationship can be changed by rotation of knob 110 to move the fulcrum on the threads 88 to account for changes in the intensity of the actuation force needed to operate the motor means 42 to develop optimum braking in the trailer.

Upon the operator wishing to override the actuation signal from the closed chamber 106, the rod 86 is depressed causing the fulcrum means 92 to pivot on bracket 46 and lever 96 to pivot about the projection on piston 60 to supply the actuation signal for the control valve means 22. The rod can be maintained in this depressed position by rotating the yoke means 46 on pin 54 and moving end 80 into a locking slot 150 as during a parking condition.

Similarly, the motor means 44 may also be activated independently of the sensed control signal of the force cell receiver 16 by the anti-sway means 112. If the trailer being pulled by the tow vehicle starts to follow a sinusoidal path with respect to the direction of travel, the first and second mass means 126 and 136 will be moved by centrifugal force away from seats 128 and 130, respectively. Upon moving away from the seats 128 and 130, air at atmospheric pressure will enter the chamber 116 and provide an actuation signal for operating the motor 42. The operation of this motor 42 will correspondingly provide the servomotor 44 with an actuation signal which will pressurize the hydraulic fluid in the master cylinder 152 in the trailer braking system. This pressurized hydraulic fluid will be communicated to the wheel brakes 154 and 156 causing a drag to exist between the trailer and the tow vehicle to eliminate the sinusoidal motion therebetween.

I claim:

1. In a tow vehicle-trailer braking system having a first servomotor for supplying the wheel brakes in the trailer with a braking force in response to an actuation force derived by a sensing means responding to an input force applied to a brake pedal for operating a second servomotor which supplies the wheel brakes in the tow vehicle with a braking force, linkage means for communicating a linear output force from the sensing means to a control valve means wherein an operational signal is generated to develop said actuation force, said linkage means comprising:

a housing for retaining said control valve means and said sensing means in a fixed position;

yoke means attached to the housing;

rod means pivotally connected to said yoke means;

lever means pivotally connected to said rod means for transferring said output force of the sensing means to the control valve; and adjustable means connected to said rod means for changing the position of the pivotal connection of the lever means with respect to the sensing means and the control valve means to modify the effect of the output force from which said actuation force is developed to provide optimum braking in the trailer, said rod means responding to an operator for supplying a manual input to override the linear output force from the sensing means by pivotally moving said rod means on said yoke means and supplying the control valve means with an independent operational force to operate the control valve means.

2. In the tow vehicle-trailer braking system, as recited in claim 1, wherein said housing further includes:

locking means for maintaining said rod means in a fixed position to provide a continual actuation signal to the control valve means in response to an operator input.

3. In the tow vehicle-trailer braking system, as recited in claim 2, wherein said yoke means includes:

guide means for maintaining said lever means in axial alignment with the sensing means and the control valve means.

4. In the tow vehicle-trailer braking system, as recited in claim 3, wherein said yoke means further includes:

bracket means secured to said guide means for holding one end of said rod means, said bracket means permitting an operator to rotate the rod means and move the pivotal connection to change the distance between the sensing means and the control valve means.

5. In the tow vehicle-trailer braking system, as recited in claim 4, wherein said yoke means further includes:

plate means for holding the guide means substantially parallel to said rod and lever means, said plate means having an opening in the center thereof; and fastener means located in said opening and secured to said control valve means for permitting said guide means to rotate when said rod means is placed in the fixed position.

6. In the tow vehicle-trailer braking system, as recited in claim 5, wherein said actuation force is independently derived by an antisway means comprising:

a housing having a chamber therein connected to the atmosphere by a first inlet port and a second inlet port, said first inlet port being located opposite said second inlet port in a plane parallel to the horizontal axis of the trailer, parallel to the wheels of the trailer, and perpendicular to the axial direction of travel of the trailer, first mass means located adjacent said first inlet port, first resilient means connected to said housing for urging said first mass means toward said first inlet port to prevent air at atmospheric pressure from entering said chamber;

second resilient means connected to said housing for urging said second mass toward said second inlet port to prevent air at atmospheric pressure from entering said chamber, said first and second masses responding to centrifugal force in overcoming said first and second resilient means respectively when said trailer follows a sinusoidal path in the direction of travel to allow air at atmospheric pressure to enter said chamber and develop an operational signal from which an operational force is created.

* * * * *